(12) United States Patent
Song et al.

(10) Patent No.: US 11,654,575 B2
(45) Date of Patent: May 23, 2023

(54) ROBOT

(71) Applicant: LG ELECTRONICS INC., Seoul (KR)

(72) Inventors: Juman Song, Seoul (KR); Youngpill Cho, Seoul (KR); Jungkwan Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 916 days.

(21) Appl. No.: 16/526,283

(22) Filed: Jul. 30, 2019

(65) Prior Publication Data

US 2020/0215699 A1 Jul. 9, 2020

Related U.S. Application Data

(63) Continuation of application No. PCT/KR2019/000226, filed on Jan. 7, 2019.

(51) Int. Cl.
*B25J 13/00* (2006.01)
*H04R 1/40* (2006.01)
(Continued)

(52) U.S. Cl.
CPC ........... *B25J 13/003* (2013.01); *B25J 9/0003* (2013.01); *B25J 11/0005* (2013.01);
(Continued)

(58) Field of Classification Search
CPC .... B25J 11/0005; B25J 13/003; B25J 19/023; B25J 9/0003; G10L 2025/786;
(Continued)

(56) References Cited

U.S. PATENT DOCUMENTS

2010/0174546 A1* 7/2010 Kim ................... B25J 13/003
704/275
2010/0220552 A1* 9/2010 Owaki ................. G01S 3/8083
367/127
(Continued)

FOREIGN PATENT DOCUMENTS

JP 2009222969 10/2009
JP 2017164854 9/2017
(Continued)

OTHER PUBLICATIONS

Korean Intellectual Property Office Application No. 10-2019-0145272, Office Action dated Dec. 28, 2020, 8 pages.
(Continued)

*Primary Examiner* — Lun-See Lao
(74) *Attorney, Agent, or Firm* — Lee, Hong, Degerman, Kang & Waimey PC

(57) ABSTRACT

A robot includes a microphone configured to receive sound signals, and one or more controllers configured to determine a reference sound pressure level of background noise based on a sound signal received at a first time point via the microphone, detect occurrence of a sound event based on the reference sound pressure level and a sound pressure level of a sound signal received at a second time point via the
(Continued)

microphone, recognize an event corresponding to the detected sound event, and control an operation of the robot based on the recognized event.

18 Claims, 14 Drawing Sheets

(51) Int. Cl.
*B25J 19/02* (2006.01)
*B25J 9/00* (2006.01)
*B25J 11/00* (2006.01)
*G10L 25/48* (2013.01)

(52) U.S. Cl.
CPC .............. *B25J 19/023* (2013.01); *G10L 25/48* (2013.01); *H04R 1/406* (2013.01)

(58) Field of Classification Search
CPC .......... G10L 25/21; G10L 25/48; G10L 25/51; G10L 25/78; H04R 1/406; H04R 2410/05
USPC ........................................................... 700/94
See application file for complete search history.

(56) References Cited

U.S. PATENT DOCUMENTS

| | | | |
|---|---|---|---|
| 2013/0232717 A1* | 9/2013 | Lee | ................. G08B 13/19613 901/1 |
| 2019/0176336 A1* | 6/2019 | Takagi | ............... G05B 19/0426 |

FOREIGN PATENT DOCUMENTS

| | | |
|---|---|---|
| KR | 1020100081587 | 7/2010 |
| KR | 1020100117793 | 11/2010 |
| KR | 1020120114670 | 10/2012 |
| KR | 1020130103204 | 9/2013 |

OTHER PUBLICATIONS

PCT International Application No. PCT/KR2019/000226, Written Opinion of the International Searching Authority dated Oct. 7, 2019, 84 pages.

* cited by examiner

FIG. 6
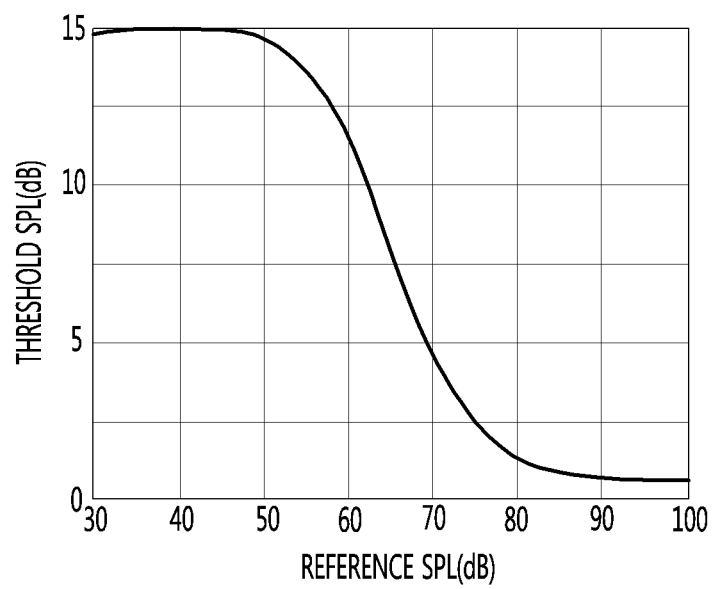
(a)
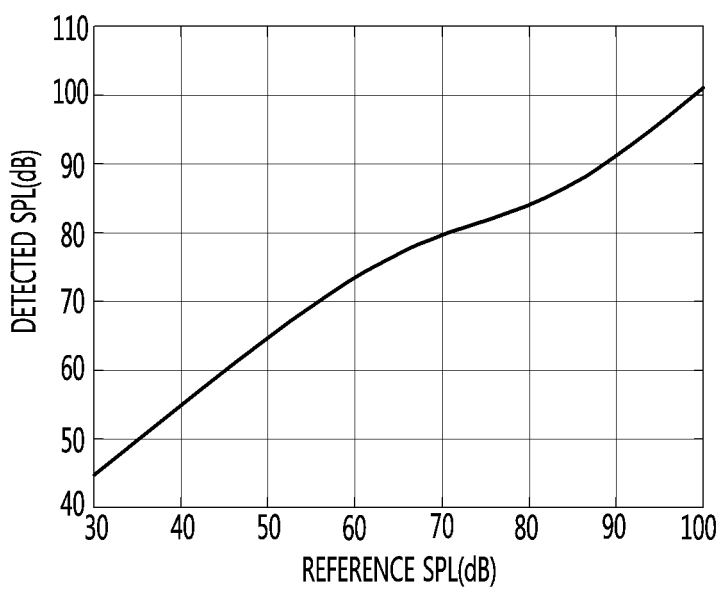
(b)

FIG. 13
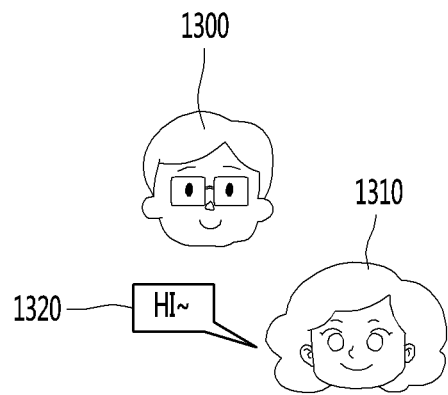
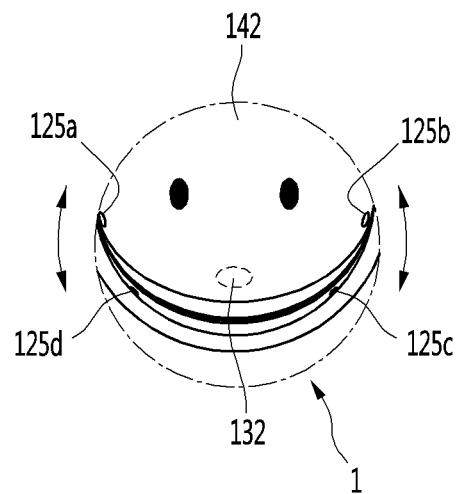

ROBOT

CROSS-REFERENCE TO RELATED APPLICATION

This application is a continuation of International Application No. PCT/KR2019/000226, filed on Jan. 7, 2019, the contents of which are hereby incorporated by reference herein in its entirety.

FIELD

The present invention relates to a robot and, more particularly, to a robot for detecting and recognizing a sound event occurring in the vicinity of the robot.

BACKGROUND

A robot is a machine capable of automatically processing or performing a given task based on abilities thereof, and robot applications are generally classified into various fields such as industry, medicine, space and ocean exploration. Recently, communication robots capable of performing communication or interaction with a human being through voice, gesture, etc. have increased in number.

Such communication robots may include various types of robots such as a guide robot disposed at a specific place to inform users of a variety of information or a home robot provided in the home. In addition, the communication robots may include an educational robot for guiding or assisting learning of a learner through interaction with the learner.

Such robots may be implemented to interact with a user or a learner using various elements. For example, the robot may include a microphone for acquiring sound generated in the vicinity of the robot or a camera for acquiring an image of the vicinity of the robot.

Accordingly, recently, technologies for providing a robot for more accurately recognizing various types of events occurring in the vicinity of the robot using an element such as a microphone or a camera and actively performing interaction or control operation based on the result of recognition have been developed.

SUMMARY

An object of the present invention is to provide a robot capable of recognizing an event from sound generated in the surroundings and performing active interaction based on the recognized event.

Another object of the present invention is to provide a robot capable of more smoothly interacting with a user by detecting a direction, in which sound is generated.

A robot according to an embodiment of the present invention includes a microphone configured to receive sound signals, and one or more controllers configured to determine a reference sound pressure level of background noise based on a sound signal received at a first time point via the microphone; detect occurrence of a sound event based on the reference sound pressure level and a sound pressure level of a sound signal received at a second time point via the microphone, recognize an event corresponding to the detected sound event, and control an operation of the robot based on the recognized event.

In one embodiment, the one or more controllers are further configured to detect the sound event when the sound pressure level of the sound signal received at the second time point exceeds a threshold sound pressure level which is set based on the reference sound pressure level In some embodiments, the threshold SPL may decrease as the reference SPL increases.

In some embodiments, the SPL calculator may calculate the SPL of the sound signal in a predetermined operation period, and the background noise analyzer may set the reference SPL of the background noise based on each sound signal in at least one continuous operation period.

In some embodiments, the background noise analyzer may acquire a maximum SPL, a minimum SPL and SPL change information from the SPL of each sound signal in the at least one continuous operation period, and variably set the reference SPL according to the acquired maximum SPL, minimum SPL and SPL change information.

The sound event detector may provide information on a section, in which occurrence of the sound event is detected, and wherein the robot may further include a sound slicing module configured to extract a sound signal corresponding to the section of the sound signal based on the provided information.

The robot may further include a memory configured to store a plurality of signal characteristics corresponding to a plurality of sound events, the sound event recognizer may extract a signal characteristic of the sound signal, compare the extracted signal characteristic with the plurality of signal characteristics, and output a sound event corresponding to a signal characteristic matching the extracted signal characteristic among the plurality of signal characteristics as a result of recognition.

In some embodiments, the signal characteristic may include at least one of a frequency characteristic or a signal change characteristic according to elapse of time.

In some embodiments, the sound event recognizer may calculate similarity between each of the plurality of signal characteristics and the extracted signal characteristic, and detect a highest signal characteristic, the calculated similarity of which is equal to or greater than reference similarity, among the plurality of signal characteristics, as a signal characteristic matching the extracted signal characteristic.

The robot may further include a display unit, a sound output unit, and a controller configured to control the display unit and the sound output unit, and the controller may control at least one of the display unit or the sound output unit based on a sound event recognized by the sound event recognizer.

In some embodiments, the memory may store interaction data corresponding to each of a plurality of sound events, and the controller may control at least one of the display unit or the sound output unit based on interaction data corresponding to the recognized sound event among the plurality of interaction data.

In some embodiments, the robot may further include an A-weighting filter configured to filter the sound signal, and the SPL calculator may measure an SPL of the sound signal filtered by the A-weighting filter.

A robot according to an embodiment of the present invention includes a plurality of microphones disposed to be spaced apart from each other, a display unit and a camera disposed to be directed in one direction, a sound event direction detector configured to acquire a plurality of sound signals from the plurality of microphones and to detect a direction, in which sound is generated, based on the plurality of sound signals, and a controller configured to control a rotation mechanism for rotating the robot such that the display unit and the camera are directed in the detected direction.

In some embodiments, the sound event direction detector may acquire sound pressure levels (SPLs) of the plurality of sound signals, estimate a distance between each of the plurality of microphones and a position where the sound is generated, from the plurality of acquired SPLs, and detect the direction, in which the sound is generated, based on positions of the plurality of microphones and the estimated distance.

In some embodiments, the sound event direction detector may detect the direction, in which the sound is generated, based on a difference between times when the plurality of sound signals is acquired.

The controller may control the camera to acquire an image including the direction, in which the sound is generated, after rotation such that the display unit and the camera are directed in the detected direction, and detect presence of a user from the image.

The controller may control the display unit and a sound output unit based on interaction data for interaction with the user, when presence of the user is detected from the image.

In some embodiments, when presence of a plurality of users is detected from the image, the controller may recognize a user having a largest facial region among the detected users as a user related to the sound.

The robot may further include a communication unit configured to establish connection with a terminal of a user, and the controller may transmit a message or notification related to the sound to the terminal of the user through the communication unit, when absence of the user is detected from the image.

The rotation mechanism may include a motor provided to rotate at least a portion of the robot about a vertical axis.

An embodiment of the present disclosure includes machine-readable non-transitory medium having stored thereon machine-executable instructions for controlling a robot, the instructions comprising determining a reference sound pressure level of background noise based on a sound signal received at a first time point via a microphone of the robot, detecting occurrence of a sound event based on the reference sound pressure level and a sound pressure level of a second sound signal received at a second time point via the microphone, recognizing an event corresponding to the detected sound event, and controlling an operation of the robot based on the recognized event.

In another embodiment, the robot may include a plurality of microphones configured to receive sound signals, a display, a camera, and one or more controllers configured to determine a source direction of a sound signal received via the plurality of microphones, and control a rotation mechanism of the robot to rotate the robot such that the display and/or the camera face the source direction of the sound signal.

BRIEF DESCRIPTION OF THE DRAWINGS

FIG. 6 is a graph illustrating an example of a threshold SPL variably set according to a reference SPL of background noise and an example of a detected SPL, at which occurrence of a sound event is detected according to the reference SPL and the threshold SPL.

FIGS. 13 to 15 are views showing examples of operation of recognizing a user related to sound at a robot when a plurality of users is located in a direction in which sound is generated.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Further, while the term "robot" is used in this disclosure, it will be understood by those of ordinary skill in the art that the disclosure is not limited to devices deemed solely with a robotic function or purpose, and that the embodiments of the present disclosure may be implemented with various other types of devices, terminals, and apparatuses, including various configurations and types of computers, electronic terminals, personal and home devices, appliances, and the like.

It will be understood that although the terms first, second, etc. may be used herein to describe various elements, these elements should not be limited by these terms. These terms are generally only used to distinguish one element from another.

It will be understood that if an element is referred to as being "connected to" or "coupled to" another element, the element can be directly connected with the other element or intervening elements may also be present. In contrast, if an element is referred to as being "directly connected to" or "directly coupled to" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
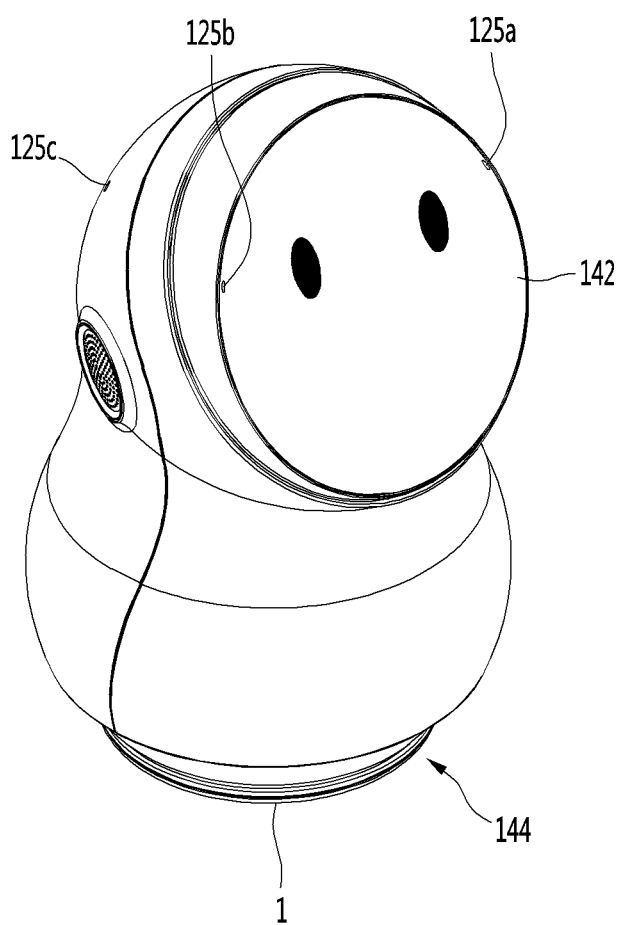
FIG. 1 is a perspective view of a robot according to an embodiment of the present invention.
Figure 2:
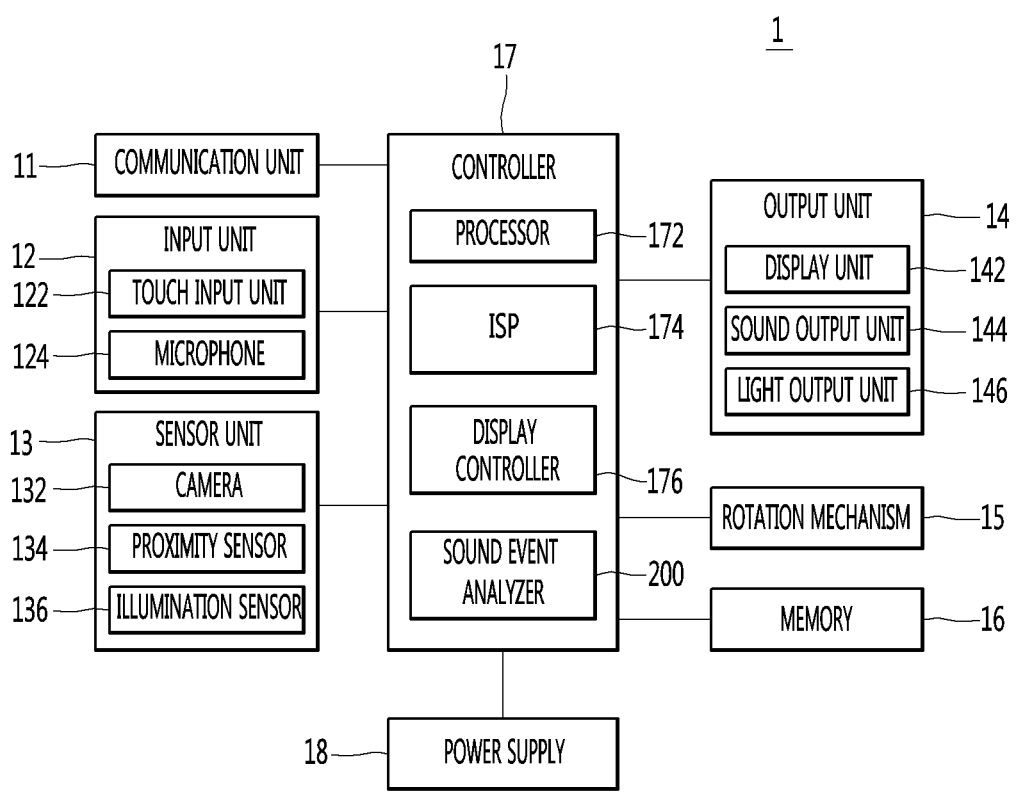
FIG. 2 is a block diagram showing the control configuration of a robot according to an embodiment of the present invention.

FIG. 1 is a perspective view of a robot according to an embodiment of the present invention, and FIG. 2 is a block diagram showing the control configuration of a robot according to an embodiment of the present invention.

Referring to FIG. 1, a robot 1 may be a communication robot for providing information to a user or induce a user to perform specific action through communication or interaction with the user.

For example, the robot 1 may be a home robot located in the home. Such a home robot may provide a variety of information to the user through interaction with the user or perform operation of monitoring an event occurring in the home.

In order to perform the above-described operations, the robot 1 may include a camera 132 (see FIG. 2) for acquiring an image of a user or the vicinity of the robot, at least one microphone 124 (see FIG. 2) for acquiring sound of a user or the vicinity of the robot, a display unit 142 for outputting graphics or text, and an input/output unit such as a sound output unit 144 (e.g., a speaker) for outputting voice or sound.

The robot 1 may include microphone holes 125a to 125c formed in an outer surface of a cover (or a case), in order to smoothly acquire sound of the outside of the robot through the at least one microphone 124 implemented therein. Each of the microphone holes 125a to 125c may be formed at a position corresponding to any one microphone 124, and the microphone 124 may communicate with the outside through the microphone holes 125a to 125c. Although three microphone holes 125a to 125c are shown as being formed in FIG. 1, the present invention is not limited thereto. Meanwhile, as described below in FIGS. 9 to 16, the robot 1 may include a plurality (or at least three) of microphones and detect a direction, in which sound is generated, using the plurality of microphones.

The display unit 142 may be disposed to face one surface from the robot 1. Hereinafter, the direction of the display unit 142 is defined as a front side of the robot 1. Meanwhile, although the sound output unit 144 is shown as being provided at the lower side of the robot 1, the position of the sound output unit 144 may be variously changed according to embodiments.

Although not shown, the robot 1 may further include a movement unit (traveling unit) from moving one position to another position. For example, the movement unit may include at least one wheel and a motor for rotating the wheel.

Hereinafter, an example of the control elements included in the robot 1 will be described in detail with reference to FIG. 2.

Referring to FIG. 2, the robot 1 may include a communication unit 11, an input unit 12, a sensor unit 13, an output unit 14, a rotation mechanism 15, a memory 16, a controller 17 and a power supply 18. The elements shown in FIG. 2 are examples for convenience of description and the robot 1 may include elements more or fewer than those shown in FIG. 2.

The communication unit 11 may include a communication module for connecting the robot 1 to a server, a mobile terminal, another robot, etc. through a network. For example, the communication unit 11 may include a short-range communication module such as Bluetooth or near field communication (NFC), a wireless Internet module such as Wi-Fi, and a mobile communication module such as long term evolution (LTE).

For example, the robot 1 may be connected to the network through an access point such as a router. Accordingly, the robot 1 may provide the server or the mobile terminal with a variety of information acquired by the input unit 12 or the sensor unit 13 through the network. In addition, the robot 1 may receive program data (firmware, etc.) related to operation of the robot 1 from the server through the network. In some embodiments, the robot 1 may share a variety of information with other robots.

The input unit 12 may include at least one input means for inputting a signal or data corresponding to user's operation or other actions (voice utterance, etc.) or sound generated in the vicinity of the robot 1. For example, the at least one input means may include a physical input means such as a button or a dial, a touch input unit 122 such as a touch pad or a touch panel, a microphone 124 for receiving user's voice or sound generated in the vicinity of the robot 1, etc. The user may input a request or a command to the robot 1 by operating the input unit 12.

In some embodiments, the controller 17 of the robot 1 may detect occurrence of a specific event, by detecting whether a sound component corresponding to the specific event is included in the sound signal, based on the sound signal received through the microphone 124. Based on the result of detection, the controller 17 may perform operation of recognizing the specific event.

Hereinafter, for convenience of description, the specific event is defined as a "sound event". In addition, "including a sound event in a sound signal" or occurrence of a sound event" means that a sound component corresponding to the sound event is included in the sound signal.

In addition, when the robot 1 includes a plurality of microphones 124, the controller 17 may detect a direction, in which sound is generated, based on the sound signal received from each of the plurality of microphones 124.

The sensor unit 13 may include at least one sensor for sensing a variety of information on the vicinity of the robot 1. For example, the sensor unit 13 may include various sensors such as a camera 132, a proximity sensor 134 and an illumination sensor 136.

The camera 132 may acquire the image of the vicinity of the robot 1. In some embodiments, the controller 17 may acquire an image including a user's face through the camera 132, thereby recognizing the user. Alternatively, the controller 17 may acquire the gesture or expression of the user through the camera 132. In this case, the camera 132 may function as the input unit 12.

The proximity sensor 134 may detect that an object such as a user is approaching the robot 1. For example, when approaching of the user is detected by the proximity sensor 134, the controller 17 may output an initial screen or initial voice through the output unit 14, thereby inducing the user to use the robot 1.

The illumination sensor 136 may detect brightness of a space in which the robot 1 is placed. The controller 17 may perform various operations based on the result detected by the illumination sensor 136 and/or time zone information.

The output unit 14 may output a variety of information related to the operation or state of the robot 1 or various services, programs and applications performed by the robot 1. In addition, the output unit 14 may output a variety of messages or information for performing interaction with the user of the robot 1.

For example, the output unit 14 may include the display unit 142, the sound output unit 144, and a light output unit 146.

The display unit 142 may output the variety of information or messages in the form of graphics. In some embodiments, the display unit 142 may be implemented in the form of a touchscreen along with the touch input unit 122. In this case, the display unit 142 may function not only as an output means but also as an input means.

The sound output unit 144 may output the variety of information or messages in the form of voice or sound. For example, the sound output unit 144 may include a speaker.

The light output unit 146 may be implemented by a light source such as an LED. The controller 17 may display the state of the robot 1 through the light output unit 146. In some embodiments, the light output unit 146 may provide the user with the variety of information along with the display unit 142 and/or the sound output unit 144, as an auxiliary output means.

The rotation mechanism 15 may include elements (e.g., a motor, etc.) for rotating the robot 1 about a vertical axis. The controller 17 may control the rotation mechanism 15 to rotate the robot 1, thereby changing the direction of the display unit 142 of the robot 1 (or the direction of the front surface of the robot 1).

A variety of data such as control data for controlling operation of the elements included in the robot 1 or data for performing operation based on input acquired through the input unit 12 or information acquired through the sensor unit 13 may be stored in the memory 16.

In addition, program data such as software modules or applications executed by any one of at least one processor or controller included in the controller 17 may be stored in the memory 16.

In addition, characteristic information of each of a plurality of sound events may be stored in the memory 16. The characteristic information may include information for identifying sound events, such as frequency characteristics of a sound signal or signal change characteristics according to a time. The plurality of sound events may include events (e.g., opening/closing of a door, door-lock operation, baby crying, etc.) occurring in a space (e.g., home) where the robot 1 is placed or various events (e.g., robot calling, conversation, etc.) occurring by the user. When the above events occur, sound corresponding to each of the events may be generated, and the robot 1 may acquire a sound signal corresponding to the above sound through the microphone 124.

The memory 16 may be various storage devices such as a ROM, a RAM, an EPROM, a flash drive, a hard drive, etc. as hardware.

The controller 17 may include at least one processor or controller for controlling operation of the robot 1. Specifically, the controller 17 may include at least one of a CPU, an application processor (AP), a microcomputer, an integrated circuit, an application specific integrated circuit (ASIC), etc.

The controller 17 may perform operations according to various embodiments of the robot 1, which will be described below with reference to FIGS. 4 to 16. The at least one processor or controller included in the controller 17 may perform the above operations using the program data or algorithm stored in the memory 16.

For example, the controller 17 may include a processor 172, an image signal processor (ISP) 174 and a display controller 176.

The processor 172 may control overall operation of the elements included in the robot 1. The ISP 174 may process an image signal acquired through the camera 132 to generate image data. The display controller 176 may control operation of the display unit 142 based on a signal or data received from the processor 172. The display unit 142 may output graphics or text under control of the display controller 176.

In some embodiments, the ISP 174 and/or the display controller 176 may be included in the processor 172. In this case, the processor 172 may be implemented by a unified processor for performing operation of the ISP 174 and/or the display controller 176.

The robot 1 according to the embodiment of the present invention may further include a sound event analyzer 200. The sound event analyzer 200 and its various elements may be implemented by the one or more controllers 17, the one or more processors, or a software module which may be executed by the one or more controllers 17, processors, or other processing component. In some embodiments, the sound event analyzer 200 may be implemented by a hardware device independently of the controller 17, such as a specialized controller or processor, and the like.

The sound event analyzer 200 may detect occurrence of a sound event based on the sound signal received through the microphone 124 and recognize the type of the sound event upon detecting occurrence of the sound event. The sound event analyzer 200 will be described in greater detail below with reference to FIG. 3.

Meanwhile, the power supply 18 of the robot 1 may supply power necessary for operation of the elements included in the robot 1. For example, the power supply 18 may include a power connector capable of connecting an external wired power cable and a battery for storing and supplying power to the elements. In some embodiments, the power supply 18 may further include a wireless charging module for wirelessly receiving power and charging the battery.

Figure 3:
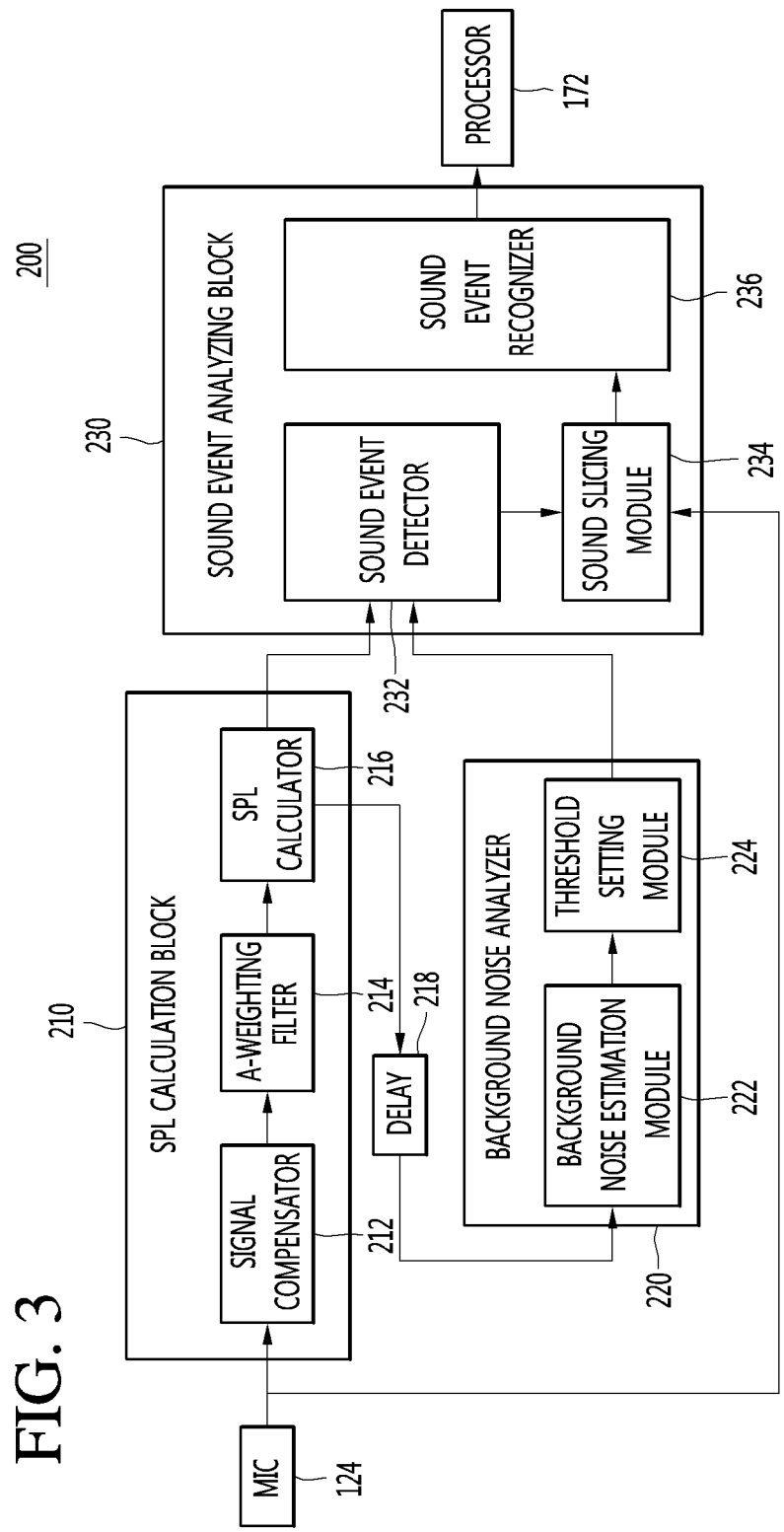
FIG. 3 is a block diagram showing the configuration of a sound event analyzer shown in FIG. 2 in detail.

FIG. 3 is a block diagram showing the configuration of the sound event analyzer shown in FIG. 2 in detail.

Referring to FIG. 3, the sound event analyzer 200 may include a sound pressure level (SPL) calculation block 210, a background noise analyzer 220, and a sound event analyzing block 230.

The SPL calculation block 210 may calculate the SPL of the sound signal received from the microphone 124. The SPL is information indicating the intensity of sound corresponding to the sound signal and indicates a ratio of the sound pressure of the sound signal to a reference sound pressure in decibel (dB).

For example, the SPL calculation block 210 may include a signal compensator 212, an A-weighting filter 214, and an SPL calculator 216.

The signal compensator 212 may compensate for the sound signal acquired through the microphone 124 based on the hardware characteristics of the microphone 124.

In this regard, the microphone 124 may have different sensitivities for each frequency band according to hardware characteristics. That is, even if sound having the same intensity (amplitude) in all frequency bands is generated, the sound signal acquired by the microphone 124 may have different amplitudes according to frequency bands. That is, the sound signal may be different from actually generated sound and the sound signal may be distorted. Accordingly, the signal compensator 212 may compensate for the sound signal, thereby acquiring the substantially same sound signal as actually generated sound (reducing distortion).

The A-weighting filter 214 filters the sound signal compensated for by the signal compensator 212 based on the human auditory characteristics and provides the filtered sound signal to the SPL calculator 216.

For example, the A-weighting filter 214 is designed based on a human audible frequency and an equal loudness contour, thereby filtering the sound signal according to the human auditory characteristics. As a result, the robot 1 may detect and recognize a sound event from the sound signal acquired according to the human auditory characteristics, thereby reacting to the sound event similarly to a human.

The A-weighting filter 214 is merely an example of the filter included in the SPL calculation block 210 and thus various filters designed according to the human auditory characteristics may be provided in the SPL calculation block 210 in addition to the A-weighting filter 214.

The SPL calculator 216 may calculate the SPL of the sound signal filtered by the A-weighting filter 214. The SPL is calculated based on the ratio of the sound pressure of the sound signal to the reference sound pressure. The method of calculating the SPL is widely known in the art and thus a description thereof will be omitted.

The calculated SPL may be provided to the background noise analyzer 220 and the sound event analyzing block 230. Meanwhile, the SPL value input to the background noise analyzer 220 may be input after being delayed by a delay block 218. That is, the background noise analyzer 220 may analyze background noise based on a currently input sound signal and provide a reference SPL and a threshold SPL set based on the analyzed background noise to the sound event analyzing block 230. That is, the background noise may be used to analyze whether a sound event is included in a next sound signal of the currently input sound signal.

Specifically, the reference SPL and the threshold SPL of the background noise are set based on the SPL of the currently input sound signal, and the sound event analyzing block 230 may detect whether the sound event is included in the next input sound signal based on the SPL of the next input sound signal, the reference SPL and the threshold SPL.

The currently input sound signal and the next input sound signal may be distinguished according to the operation period of the sound event analyzer 200. That is, the sound signal may be continuously acquired through the microphone 124, and the sound event analyzer 200 may analyze the continuously acquired sound signals in units of predetermined operation period to detect and recognize the sound event. For example, if it is assumed that the currently input sound signal corresponds to a sound signal of a first period, the next input sound signal may correspond to a sound signal of a second period which follows the first period.

The background noise analyzer 220 may set the reference SPL of the background noise and the threshold SPL based on the reference SPL, based on the SPL of the sound signal calculated by the SPL calculation block 210.

A background noise estimation module 222 included in the background noise analyzer 220 may set the reference SPL of the background noise based on the SPL of each of the sound signals of at least one continuous period.

The background noise analyzer 220 may acquire information such as a maximum SPL, a minimum SPL, SPL change information (slope change, etc.) from the SPL of each of the sound signals of the at least one continuous period and variably set the reference SPL based on the acquired information. The background noise analyzer 220 may include an algorithm for setting the reference SPL based on the acquired information.

For example, the reference SPL may increase as the maximum SPL and the minimum SPL increase. For example, if the SPL, based on the acquired information, gradually increases, the reference SPL may gradually increase and, as the SPL decreases (loudness is reduced), the reference SPL may rapidly decrease.

A threshold setting module 224 may set the threshold SPL corresponding to the set reference SPL. The threshold SPL may be an element for detecting a sound event having an intensity greater than the sound intensity of the background noise. That is, the sound event analyzing block 230 may detect that a sound event has occurred, when a sound signal having an SPL greater than the reference SPL by at least the threshold SPL is detected.

Meanwhile, the threshold setting module 224 may variably set the threshold SPL based on the reference SPL. The threshold SPL may be an SPL value used to determine how much variance is required from the reference SPL before an event is detected. For example, the threshold setting module 224 may set the threshold SPL which decreases as the reference SPL increases, but the present invention is not limited thereto. The threshold SPL may be varied based on a number of other factors than only the reference SPL, such as time of day, detected information of the environment or surroundings, and the like. The threshold SPL may also be varied based on an input setting input by a user or other system.

The sound event analyzing block 230 may detect occurrence of a sound event from the received sound signal and recognize the type of the detected sound event.

For example, the sound event analyzing block 230 may include a sound event detector 232, a sound slicing module 234, and a sound event recognizer 236.

The sound event detector 232 may detect occurrence of a sound event based on the calculated SPL of the sound signal and the reference SPL of the background noise. For example, the sound event detector 232 may detect that the sound event has occurred when the calculated SPL is greater than the reference SPL by the threshold SPL or more. For example, the sound event detector 232 may provide the sound slicing module 234 with information on a start point and an end point of a period (operation period) in which the detected sound event has occurred.

The sound slicing module 234 may extract a sound signal of a period in which occurrence of the sound event is detected by the sound event detector 232. The sound slicing module 234 may extract the sound signal between the start point and the end point of the period (operation period), in which occurrence of the sound event is detected by the sound event detector 232, of the sound signal received from the microphone 124 and provide the extracted sound signal to the sound event recognizer 236.

The sound event recognizer 236 may recognize the sound event corresponding to the sound signal based on the signal characteristics of the extracted sound signal.

Specifically, the sound event recognizer 236 may compare a plurality of signal characteristics stored in the memory 16 or an internal memory of the sound event analyzer 200 with the signal characteristics of the extracted sound signal. Each of the plurality of signal characteristics may correspond to any one sound event.

The signal characteristics may include unique characteristics related to the sound event, such as frequency characteristics of the sound event or signal change characteristics according to elapse of time.

The sound event recognizer 236 may calculate similarity between each of the plurality of signal characteristics and the signal characteristic of the extracted sound signal. The sound event recognizer 236 may detect that a highest signal characteristic, the calculated similarity of which is equal to or greater than reference similarity, among the plurality of signal characteristics matches the signal characteristic of the extracted sound signal.

Based on the result of detection, the sound event recognizer 236 may recognize a sound event included in the extracted sound signal as a sound event corresponding to the matched signal characteristic. The sound event recognizer 236 may provide the result of recognition to the processor 172.

In some embodiments, when a signal characteristic having similarity equal to or greater than the reference similarity is not present as the result of recognition, the sound event analyzing block 230 may provide information indicating that the sound event cannot be recognized to the processor 172. The processor 172 may output the result of recognition to the user through the output unit 14 or the communication unit 11 and acquire information on the sound event included in the sound signal from the user. The processor 172 may store the information on the signal characteristic acquired from the sound signal and the sound event in the memory 16 based on the acquired information. Accordingly, the sound event analyzer 200 may recognize the sound event included in the sound signal when a sound signal having a similar signal characteristic is received in the future.

Such a sound event recognizer 236 extracts the signal characteristic from the sound signal and compares the extracted signal characteristics with the plurality of signal characteristics to calculate similarity and thus may have relatively higher load as compared to the other elements.

According to the embodiment of the present invention, the sound event recognizer 236 may be activated only when occurrence of a sound event is detected by the sound event detector 232. Therefore, it is possible to efficiently reduce the load as compared to the case where the sound event recognizer 236 is continuously activated, which can improve the overall processing speed or performance of the robot 1.

Hereinafter, embodiments related to operation of detecting and recognizing the sound event of the robot 1 will be described with reference to FIGS. 4 to 8.

Figure 4:
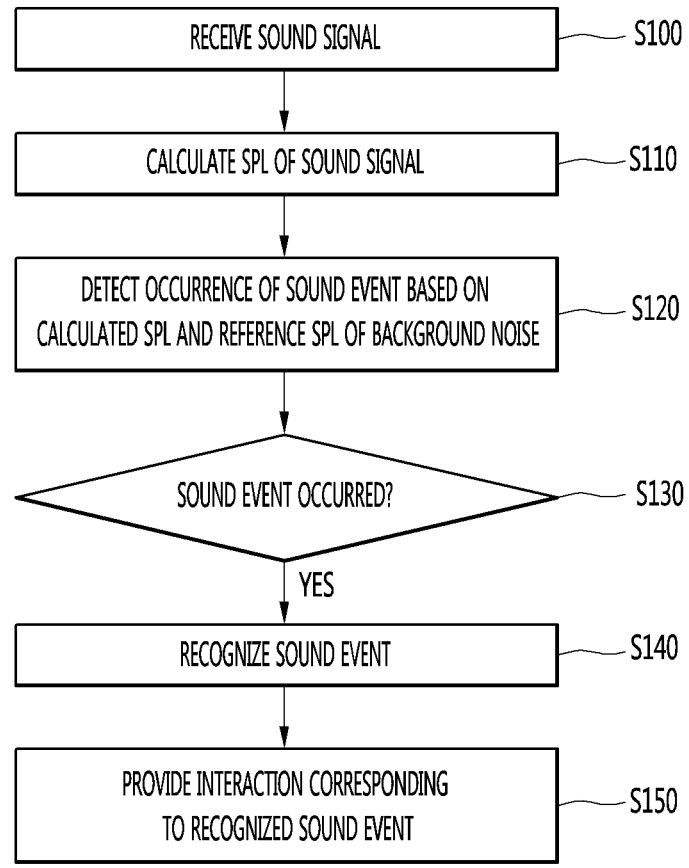
FIG. 4 is a flowchart schematically illustrating operation of detecting and recognizing a sound event of a robot according to an embodiment of the present invention.

FIG. 4 is a flowchart schematically illustrating detecting and recognizing a sound event according to an embodiment of the present invention.

Referring to FIG. 4, a sound signal may be received corresponding to sound generated in the vicinity of the robot 1 (S100).

The microphone 124 or other audio processing component such as an analog to digital audio converter provided in the robot 1 may convert the sound generated in the vicinity of the robot 1 into an electrical signal (sound signal). The controller 17 may receive the converted sound signal from the microphone 124.

The robot 1 may calculate the SPL of the received sound signal (S110).

The SPL calculation block 210 of the sound event analyzer 200 may calculate the SPL from the received sound signal.

As described above with reference to FIG. 3, the SPL calculation block 210 may compensate for the sound signal through the signal compensator 212. The compensated sound signal may be filtered through the A-weighting filter 214, and the SPL calculator 216 may calculate the SPL of the filtered sound signal.

The calculated SPL may be provided to the background noise analyzer 220 and the sound event analyzing block 230.

The robot 1 may detect occurrence of a sound event based on the calculated SPL and the reference SPL of the background noise (S120).

The sound event detector 232 included in the sound event analyzing block 230 may detect whether a sound event is included in the sound signal, that is, whether a sound event has occurred, based on the SPL of the sound signal calculated by the SPL calculation block 210 and the reference SPL set by the background noise analyzer 220.

Upon detecting that the sound event has occurred (YES of S130), the robot 1 may recognize the sound event included in the sound signal (S140).

The sound event recognizer 236 included in the sound event analyzing block 230 may recognize which sound event is included in the sound signal, upon detecting that the sound event has occurred.

The sound event recognizer 236 may extract the signal characteristic from the sound signal and compare the extracted signal characteristic with the plurality of signal characteristics stored in the memory 16, thereby calculating similarity.

The sound event recognizer 236 may detect that a highest signal characteristic, the calculated similarity of which is equal to or greater than reference similarity, among the plurality of signal characteristics matches the signal characteristic of the extracted sound signal. The sound event recognizer 236 may recognize that the sound event included in the extracted sound signal is a sound event corresponding to the matched signal characteristic.

The robot 1 may provide interaction corresponding to the recognized sound event (S150).

The processor 172 may acquire information on the recognized sound event from the sound event analyzer 200.

Meanwhile, interaction data corresponding to each of the plurality of sound events may be stored in the memory 16. The interaction data may include graphics, text, sound, voice data, etc. output through the output unit 14. In addition, the interaction data may include a message or notification to be transmitted to the mobile terminal of the user through the communication unit 11 or information related to a variety of processing operations performed in association with the sound event.

The processor 172 may output the interaction data corresponding to the recognized sound event, thereby providing the interaction. For example, the interaction may include communication with the user based on the sound event, a simple reaction to the sound event, etc. For the purposes of this discussion, various operations are discussed as being performed by components of robot 1, however it will be understood that one or more or all of these operations may be performed by other aspects of robot 1, such as the one or more controllers or processors. Further, it will be understood that one or more or all of these operations may be performed via other means, including other terminals or apparatuses configured to perform the operations which are in communication with robot 1.

Hereinafter, operation of the robot 1 described above with reference to FIG. 4 will be described in detail with reference to FIGS. 5 to 8.

Figure 5:
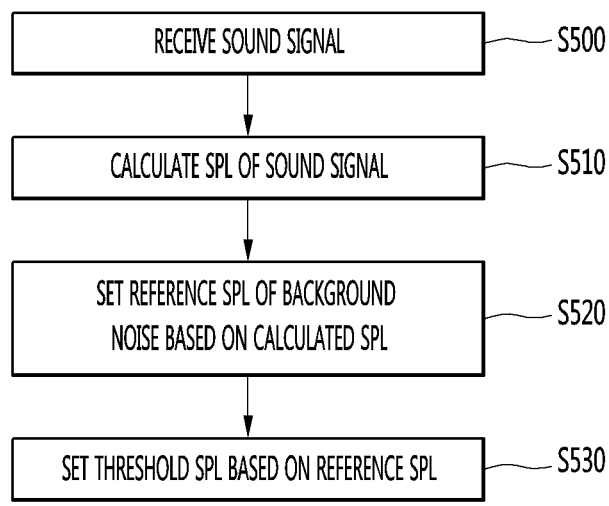
FIG. 5 is a flowchart illustrating operation of setting a reference sound pressure level (SPL) of background noise from a sound signal at a robot according to an embodiment of the present invention.

FIG. 5 is a flowchart illustrating operation of setting a reference sound pressure level (SPL) of background noise from a sound signal at a robot according to an embodiment of the present invention.

Referring to FIG. 5, steps S500 and S510 are substantially equal to steps S100 and S110 of FIG. 4 and thus a description thereof will be omitted.

The robot 1 may set the reference SPL of the background noise based on the SPL calculated from the sound signal (S520).

The background noise estimation module 222 included in the background noise analyzer 220 of the robot 1 may receive the calculated SPL of the sound signal during a predetermined period from the SPL calculator 216.

The background noise estimation module 222 may set the reference SPL of the background noise based on the SPL of the sound signal received during at least one continuous period.

As described above in FIG. 3, the background noise estimation module 222 may acquire information such as a maximum SPL, a minimum SPL and SPL change information (slope change, etc.) from the SPL of each sound signal during the at least one continuous period and variably set the reference SPL based on the acquired information.

The robot 1 may set a threshold SPL for detecting occurrence of the sound event based on the set reference SPL (S530).

The threshold setting module 224 may variably set the threshold SPL based on the reference SPL. Matching information of the threshold SPL corresponding to each of the reference SPLs or an equation or algorithm for setting the threshold SPL using the reference SPL may be stored in the memory 16. The threshold setting module 224 may set the threshold SPL based on the matching information or the equation or algorithm stored in the memory 16.

That is, the robot 1 may variably set the threshold SPL according to the intensity of the sound corresponding to the background noise, thereby efficiently detecting and recognizing the sound event even when a combination of various types of sounds is received. For the purposes of this discussion, various operations are discussed as being performed by components of robot 1, however it will be understood that one or more or all of these operations may be performed by other aspects of robot 1, such as the one or more controllers or processors. Further, it will be understood that one or more or all of these operations may be performed via other means, including other terminals or apparatuses configured to perform the operations which are in communication with robot 1.

FIG. 6 is a graph illustrating an example of a threshold SPL variably set according to a reference SPL of background noise and an example of a detected SPL, at which occurrence of a sound event is detected according to the reference SPL and the threshold SPL.

The matching information or the equation or the algorithm for setting the threshold SPL corresponding to each of the reference SPLs of the background noise may be stored in the memory 16. The graph based on the matching information, the equation or the algorithm is shown in (a) of FIG. 6. For example, if the reference SPL is 45 decibel (dB), the threshold setting module 224 may set the threshold SPL to 15 decibel (dB). The above graph is merely an example, for convenience of description, and the threshold SPL corresponding to the reference SPL may be changed according to the matching information, the equation or the algorithm.

Meanwhile, in the graph shown in (a) of FIG. 6, the threshold SPL may decrease as the reference SPL increases, because there is a limitation in the SPL of the sound event.

The sound event detector 232 may detect whether the sound event is included in the sound signal (or whether the sound event has occurred) based on the calculated SPL (detected SPL) of the sound signal and the reference SPL and the threshold SPL.

Referring to the graph shown in (b) of FIG. 6, the sound event detector 232 may detect that the sound event has occurred when the calculated SPL (the detected SPL) is greater than the reference SPL by the threshold SPL. For example, if the reference SPL is 45 decibel, the sound event detector 232 may detect that the sound event has occurred when the detected SPL is 60 decibel or more.

A human may not smoothly detect sound smaller than background noise. Based on this, the robot 1 is implemented to detect only the sound event louder than the background noise, thereby detecting the sound event in a manner more similar to the human.

Figure 7:
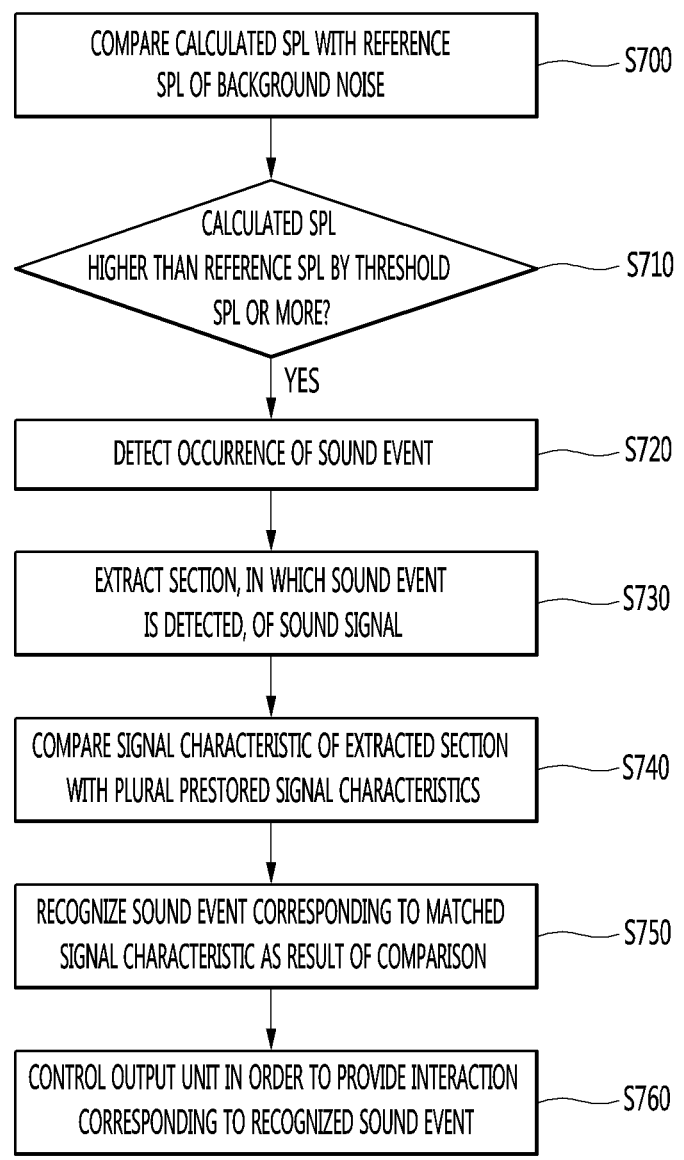
FIG. 7 is a flowchart illustrating operation of detecting occurrence of a sound event from a sound signal and operation of recognizing the sound event when the sound event is detected, at a robot according to an embodiment of the present invention.

FIG. 7 is a flowchart illustrating detecting occurrence of a sound event from a sound signal and recognizing the sound event when the sound event is detected, according to an embodiment of the present invention.

Referring to FIG. 7, the robot 1 may compare the calculated SPL of the sound signal with the reference SPL of the background noise (S700).

If the calculated SPL is greater than the reference SPL by the threshold SPL as the result of comparison (YES of S710), the robot 1 may detect that the sound event has occurred from the sound signal (S720).

The robot 1 may extract a section, in which the sound event is detected, from the sound signal (S730).

The sound event detector 232 may provide the sound slicing module 234 with information on the start point and the end point of the period (operation period) in which the detected sound event has occurred.

The start point may mean an operation period in which occurrence of the sound event is first detected, and the end point may mean an operation period in which occurrence of the sound event is last detected, among the operation periods in which occurrence of the sound event is continuously detected.

The sound slicing module 234 may extract the sound signal between the start point and the end point based on the result of detection of the sound event detector 232.

The robot 1 may compare the signal characteristic of the extracted period with the plurality of signal characteristics corresponding to the plurality of prestored sound events (S740). The robot 1 may recognize that the sound event corresponding to the matched signal characteristic has occurred (S750), when a signal characteristic matching the signal characteristic of the extracted period is present in the plurality of signal characteristics.

The sound event recognizer 236 may extract the signal characteristic of the extracted sound signal. The signal characteristic may include the frequency characteristic of the sound event and the signal change characteristic according to elapse of time.

The sound event recognizer 236 may compare the plurality of signal characteristics stored in the memory 16 with the extracted signal characteristic, thereby calculating similarity.

The sound event recognizer 236 may detect that a highest signal characteristic, the calculated similarity of which is equal to or greater than reference similarity, among the plurality of signal characteristics matches the signal characteristic of the extracted sound signal.

Based on the result of detection, the sound event recognizer 236 may recognize that the sound event included in the extracted sound signal corresponds to the matched signal characteristic.

The robot 1 may control the output unit 14 to provide interaction corresponding to the recognized sound event (S760).

Step S760 is substantially equal to step S150 of FIG. 4 and a description thereof will be omitted.

For the purposes of this discussion, various operations are discussed as being performed by components of robot 1, however it will be understood that one or more or all of these operations may be performed by other aspects of robot 1, such as the one or more controllers or processors. Further, it will be understood that one or more or all of these operations may be performed via other means, including other terminals or apparatuses configured to perform the operations which are in communication with robot 1.

Figure 8:
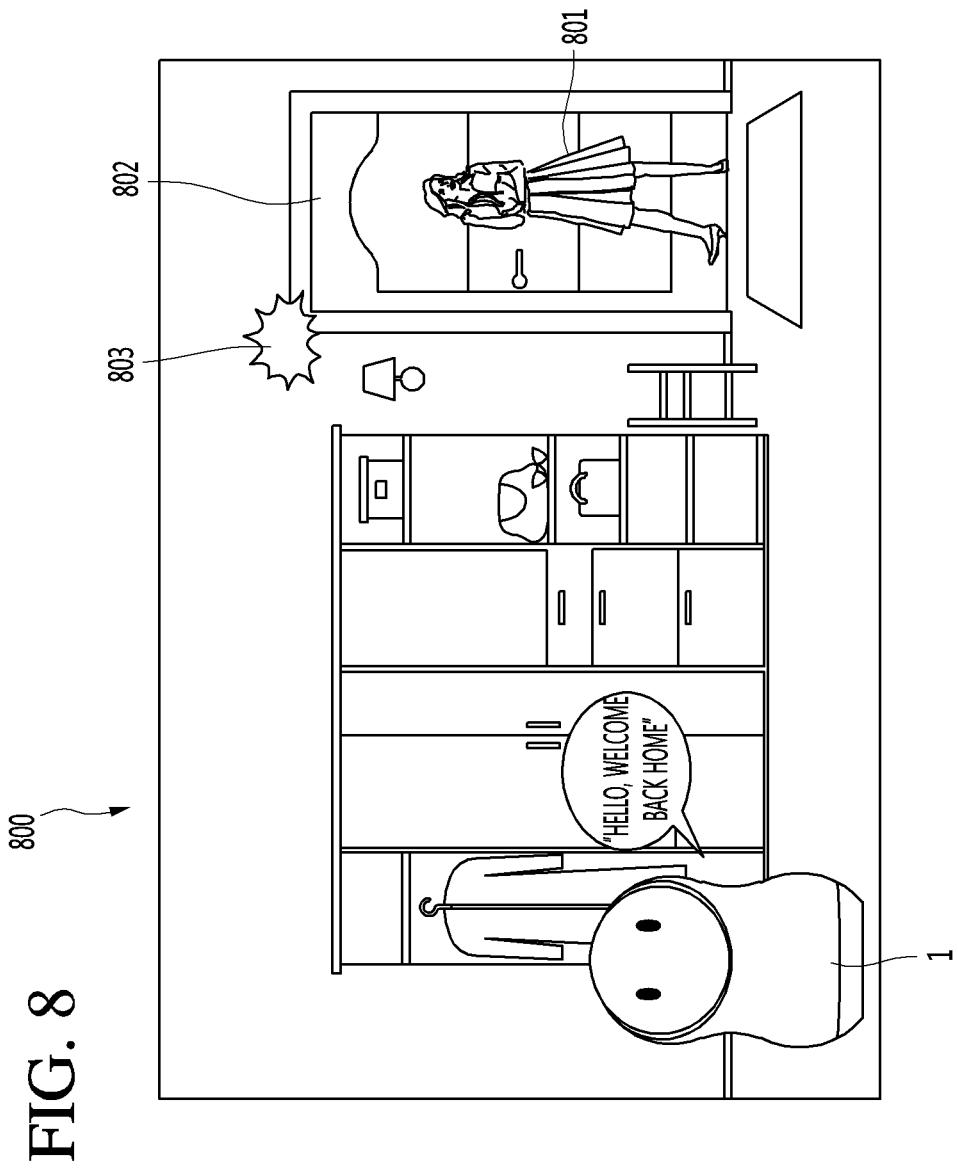
FIG. 8 is a view showing an example related to the embodiment of FIGS. 4 to 7.

FIG. 8 is a view showing an example related to the embodiment of FIGS. 4 to 7.

Referring to FIG. 8, the robot 1 may be implemented by a home robot placed in the home.

The robot 1 may acquire a variety of sound generated in the home through the microphone 124.

For example, a user 801 may return to the home by opening a front door 802, entering the home and closing the front door 802. At this time, a sound event 803 corresponding to opening/closing of the front door 802 may be generated.

The robot 1 may acquire a sound signal including the sound event 803 through the microphone 124.

The sound event analyzer 200 of the robot 1 may calculate the SPL of the acquired sound signal and compare the calculated SPL with the reference SPL of background noise.

Meanwhile, since the user 801 is not present in the home before the sound event 803 occurs, there may be no sound or very little sound less than the sound event 803 generated in the home prior to the sound event 803. Accordingly, the reference SPL may be less than the calculated SPL by the threshold SPL.

That is, the sound event analyzer 200 may detect that the calculated SPL is greater than the reference SPL by the threshold SPL and detect that the sound event 803 has occurred according to the result of detection. As the sound event 803 is detected, the sound event analyzer 200 may recognize the sound event 803 through the sound event recognizer 236.

The sound event recognizer 236 may recognize that the sound event 803 is "opening/closing of the front door". Accordingly, the robot 1 may perform interaction with the user 801 using interaction data corresponding to "opening/closing of the front door". For example, the interaction data may include voice data corresponding to "Hi. Welcome". In this case, the processor 172 may perform interaction with the user, by outputting the voice data through the sound output unit 144.

That is, according to the embodiments shown in FIGS. 4 to 8, the robot 1 may acquire sound generated in the vicinity thereof to automatically recognize occurrence of a specific event and intelligently perform interaction according to the recognized event.

In addition, the robot 1 may filter the sound signal acquired through the microphone 124 based on the human auditory characteristics or detect the sound event louder than the background noise, thereby reacting to the sound event and acting similarly to a human.

Hereinafter, embodiments related to operation of detecting a direction, in which sound is generated, at the robot 1 will be described.

Figure 9:
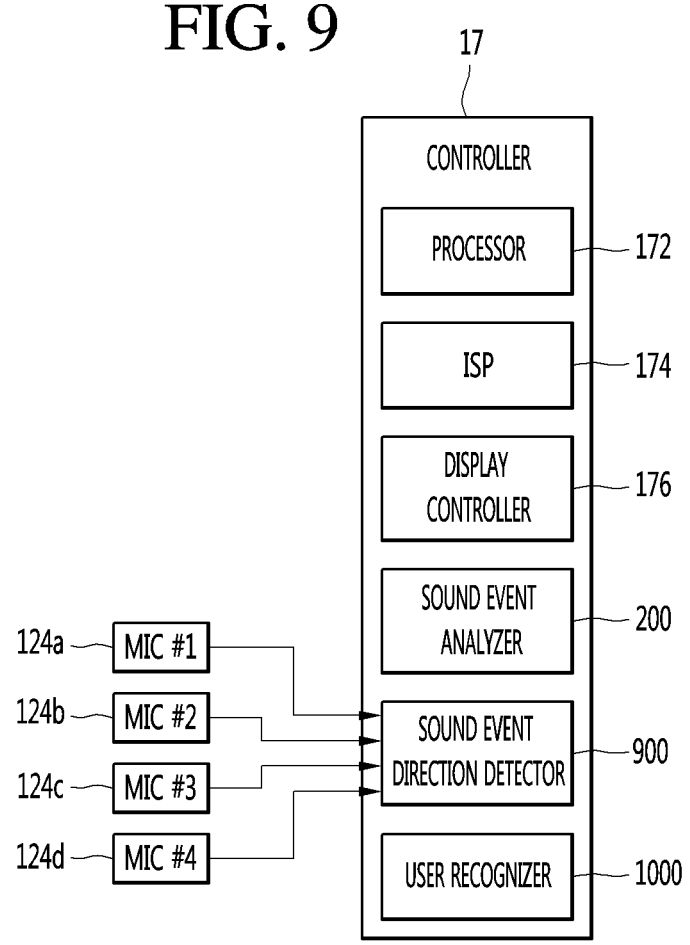
FIG. 9 is a block diagram showing a controller of a robot according to an embodiment of the present invention.

FIG. 9 is a block diagram showing a controller of a robot according to an embodiment of the present invention.

As described above in FIGS. 1 to 2, the robot 1 may include a plurality of microphones and detect the direction, in which sound is generated, based on sound signals received from the plurality of microphones.

Referring to FIG. 9, the robot 1 may include a sound event direction detector 900 for receiving the sound signal of each of the plurality of microphones 124*a*, 124*b*, 124*c* and 124*d* and detect a direction in which sound (or a sound event) is generated.

Figure 11:
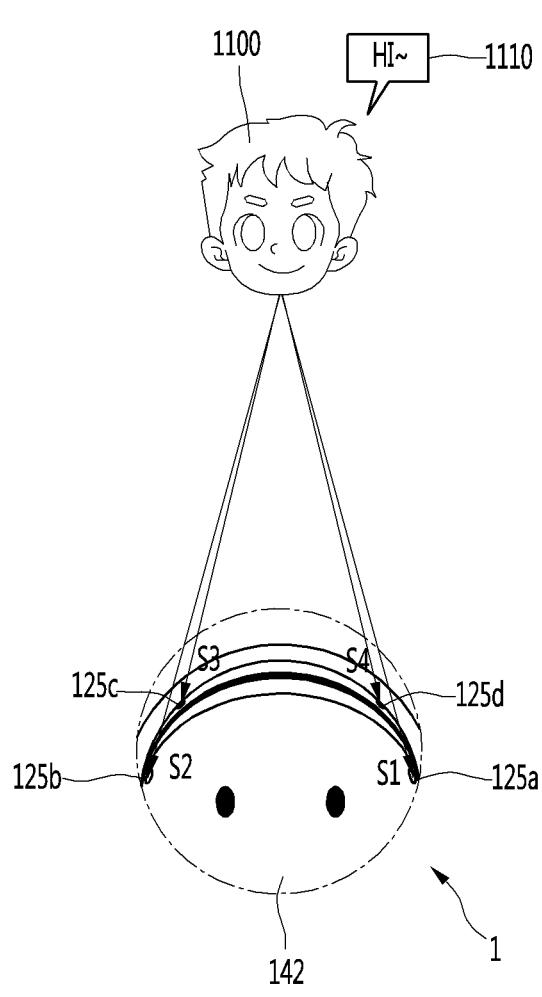
FIGS. 11 to 12 are views showing examples related to the embodiment of FIG. 10.

Meanwhile, although the robot 1 is shown as including four microphones 124*a* to 124*d* in FIG. 9, the robot 1 may include a plurality (preferably at least three) of microphones. The plurality of microphones 124*a* to 124*d* may be disposed to be spaced apart from each other, at least in a lateral direction. For example, as shown in FIG. 11, the first microphone 124*a* may be disposed on the front left side of the robot 1 and the second microphone 124*b* may be disposed on the front right side of the robot 1. In addition, the third microphone 124*c* may be disposed on the rear right side of the robot 1 and the fourth microphone 124*d* may be disposed on the rear left side of the robot 1. That is, as the plurality of microphones 124*a* to 124*d* are disposed to be spaced apart from each other, the SPLs of the sound signals acquired by the microphones 124*a* to 124*d* may be different and times when the sound signals are acquired by each microphone may be different.

The sound event direction detector 900 may detect the direction, in which sound (or a sound event) corresponding to the sound signal is generated, based on a difference between the SPLs of the sound signals received from the plurality of microphones 124*a* to 124*d* or a difference between the times when the sound signals are acquired.

Meanwhile, the robot 1 may further include a user recognizer 1000 for recognizing a user located around the robot 1 based on an image acquired through the camera 132.

The user recognizer 1000 may recognize the user located around the robot 1 using various known face recognition algorithms. At this time, the user recognized by the user recognizer 1000 may include not only a user already registered in the robot 1 but also the other persons.

In some embodiments, the sound event analyzer 200, sound event direction detector 900 and the user recognizer 1000 may correspond to the one or more controllers 17 or one or more processors 172, or other components of robot 1 configured to perform the operations described herein for the sound event analyzer 200, sound event direction detector 900 and user recognizer 1000.

Figure 10:
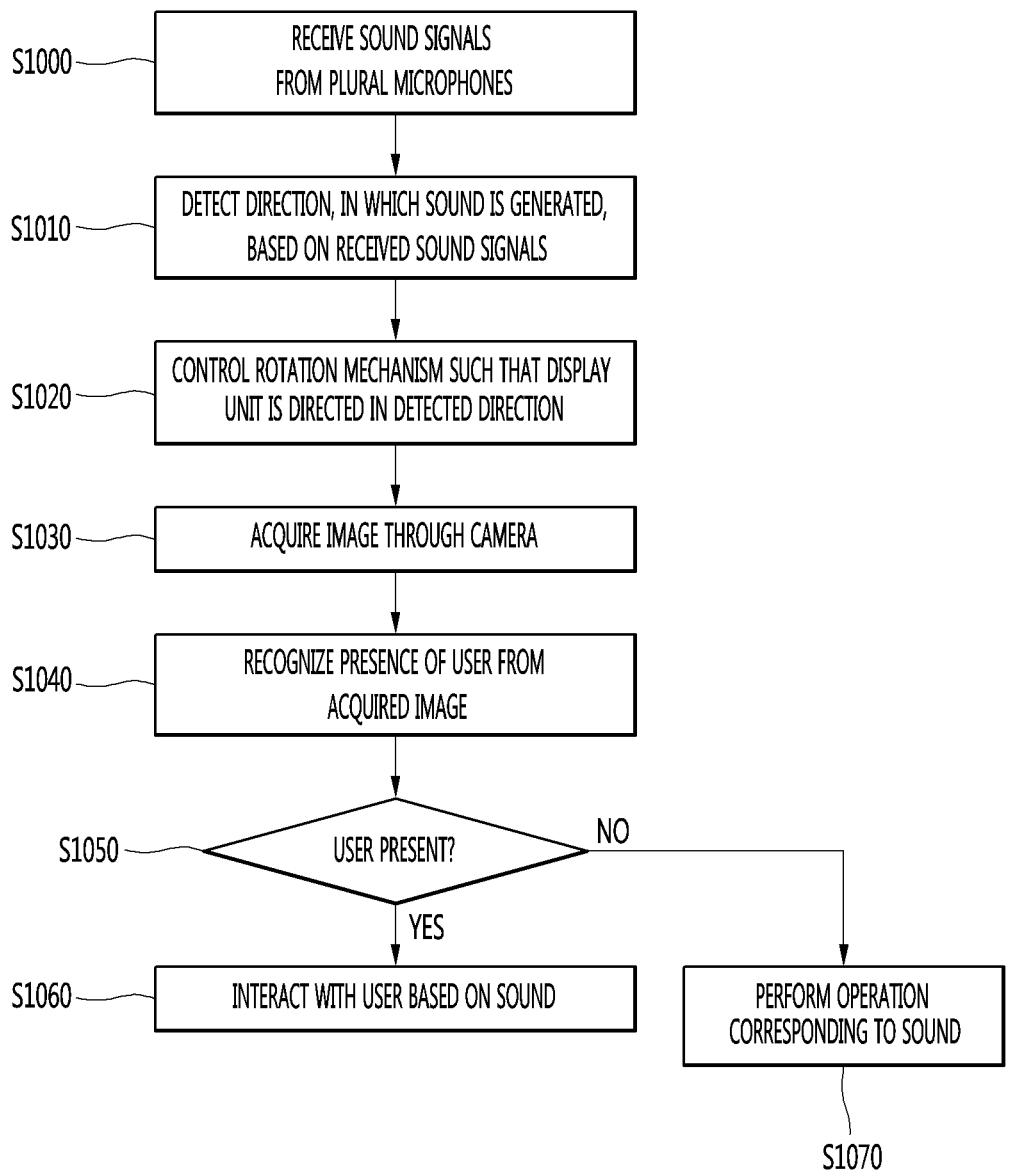
FIG. 10 is a flowchart illustrating operation of detecting a direction, in which sound is generated, of a robot according to an embodiment of the present invention and control operation related thereto.

FIG. 10 is a flowchart illustrating operation of detecting a direction, in which sound is generated, according to an embodiment of the present invention and control operation related thereto.

The embodiments of FIGS. 10 to 16 may be performed in parallel with the embodiments of FIGS. 4 to 8. However, in some embodiments, the embodiments of FIGS. 10 to 16 may be performed only when the sound event is recognized according to the embodiments of FIGS. 4 to 8.

Referring to FIG. 10, the robot 1 may receive a sound signal from each of the plurality of microphones 124*a* to 124*d* (S1000) and detect the direction, in which sound is generated, based on the received sound signals (S1010).

For example, the sound event direction detector 900 included in the robot 1 may calculate the SPL of each of the sound signals received from the plurality of microphones 124*a* to 124*d*. In this case, the sound event direction detector 900 may calculate the SPL of each of the sound signals using the SPL calculation block 210 described above in FIG. 3. Alternatively, the sound event direction detector 900 may directly include an element equal or similar to the SPL calculation block 210.

The sound event direction detector 900 may detect the direction, in which sound is generated, based on the calculated SPLs. For example, the sound event direction detector 900 may estimate a distance between each of the plurality of microphones 124*a* to 124*d* and a position where sound is generated from the SPL of the sound signal corresponding to each of the plurality of microphones 124*a* to 124*d*. The sound event direction detector 900 may detect the direction in which sound is generated, using the position of each of the plurality of microphones 124*a* to 124*d* and a triangulation method based on the estimated distance.

Alternatively, the sound event direction detector 900 may detect the direction, in which sound is generated, using a difference between times when the sound signals received from the plurality of microphones 124*a* to 124*d* are acquired.

In some embodiments, step S1010 may be performed only when the sound event analyzer 200 described above in FIGS. 3 to 8 detects that the sound event is included in the sound signal and the detected sound event is recognized.

The robot 1 may control the rotation mechanism 15 such that the display unit 142 is directed in the detected direction (S1020).

Meanwhile, since the SPLs of the sound signals received from the microphones 124*a* to 124*d* are not constant, the robot 1 may detect only the direction, in which sound is generated, by performing step S1010, but may not accurately detect a position where sound is generated.

Accordingly, the processor 172 may control the rotation mechanism 15 such that the front surface, that is, the display unit 142, of the robot 1 is directed in the detected direction.

The robot 1 may acquire an image through the camera 132 (S1030), and recognize presence/absence of a user from the acquired image (S1040).

When the front surface of the robot 1 is directed in the detected direction, the camera 132 installed in the robot 1 may be directed in the detected direction. That is, the camera 132 may be disposed to be directed in the same direction as the display unit 142.

The processor 172 may acquire an image of the detected direction through the camera 132 when the front surface is directed in the detected direction, under control of the rotation mechanism 15.

The user recognizer 1000 included in the robot 1 may recognize whether a user (person) is included in the acquired image using various known face recognition algorithms.

When the user is present as the result of recognition (YES of S1050), the robot 1 may interact with the user based on the sound (S1060).

In contrast, when the user is not present as the result of recognition (NO of S1050), the robot 1 may perform operation corresponding to the sound (S1070).

For example, interaction data corresponding to sound (or a sound event) may be stored in the memory 16. In addition, the interaction data may be classified into interaction data when a user is present and interaction data when a user is not present.

As described above, the interaction data may include graphics, text, sound, voice data, etc. output through the output unit 14. In addition, the interaction data may include a message or notification to be transmitted to the mobile terminal of the user through the communication unit 11 or information related to a variety of processing operations performed in association with the sound event.

Accordingly, the processor 172 may perform communication with the user based on the interaction data when the user is recognized according to the result of recognition of the user recognizer 1000. In contrast, when the user is not recognized, the processor 172 may process a simple reaction (sound output, etc.) to the sound event or transmit a message or notification related to the sound event to the terminal of the user. For the purposes of this discussion, various operations are discussed as being performed by components of robot 1, however it will be understood that these components are implemented as one or more other aspects of robot 1, or that one or more or all of these operations may be performed by one or more other aspects of robot 1, such as the one or more controllers or processors. Further, it will be understood that one or more or all of these operations may be performed via other means, including other terminals or apparatuses configured to perform the operations which are in communication with robot 1.

Embodiments related thereto will be described with reference to FIGS. 11 o 16.

Figure 12:
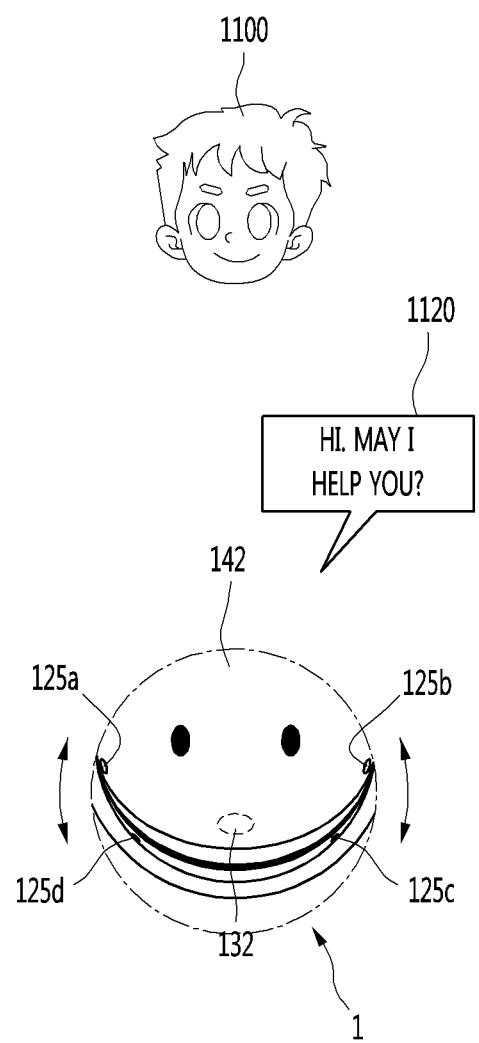

FIGS. 11 to 12 are views showing examples related to the embodiment of FIG. 10.

Referring to FIGS. 11 and 12, a user 1100 may utter voice 1110 for calling the robot 1.

Each of the plurality of microphones 124*a* to 124*d* provided in the robot 1 may receive sound including the voice 1110 of the user 1100 and acquire sound signals S1 to S4 corresponding to the received sound.

The sound event direction detector 900 of the robot 1 may detect a direction, in which the voice 1110 is generated, based on the sound signals S1 to S4.

As shown in FIG. 11, when the voice 1110 is uttered on the rear side of the robot 1, the SPLs of the first sound signal S1 and the second sound signal may be lower than the SPLs of the third sound signal and the fourth sound signal S4. In addition, times when the first sound signal S1 and the second sound signal S2 are acquired may be later than times when the third sound signal S3 and the fourth sound signal S4 are acquired.

The sound event direction detector 900 may detect the direction, in which the voice 1110 is generated, is the rear side of the robot 1, based on the SPLs of the sound signals S1 to S4 or the times when the sound signals S1 to S4 are acquired.

As shown in FIG. 12, the processor 172 may control the rotation mechanism 15 such that the front surface of the robot 1 is directed in the detected direction based on the detected direction. According to the result of control, the display unit 142 of the robot 1 may be directed in the detected direction.

When the front surface of the robot is directed in the detected direction under control of the rotation mechanism 15, the processor 172 may acquire an image of the detected direction through the camera 132.

The user recognizer 1000 included in the robot 1 may recognize that the user 1100 is included from the acquired image using various known face recognition algorithms.

The processor 172 may output a message 1120 for interaction (communication) with the user through the display unit 142 or the sound output unit 144 based on the result of recognition.

Figure 14:
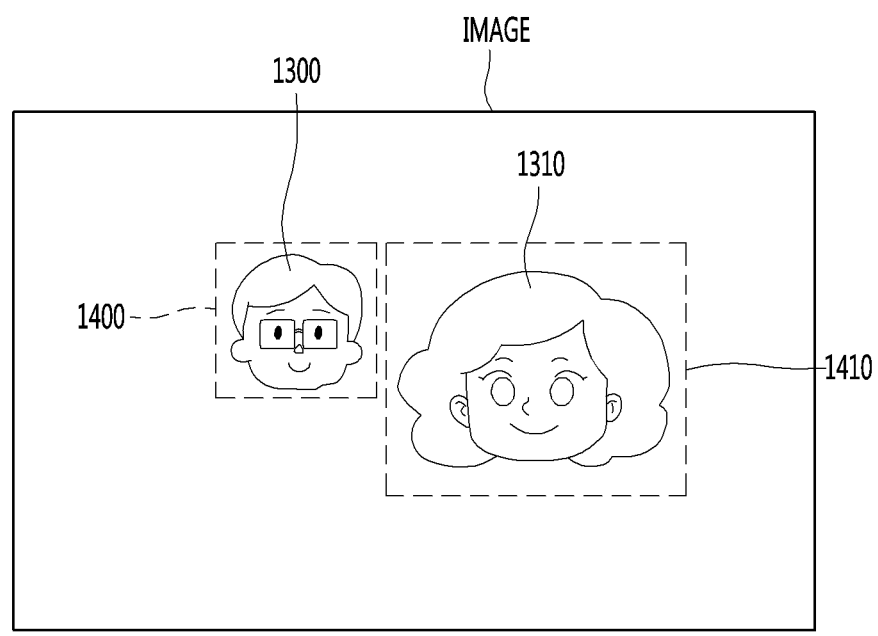
Figure 15:
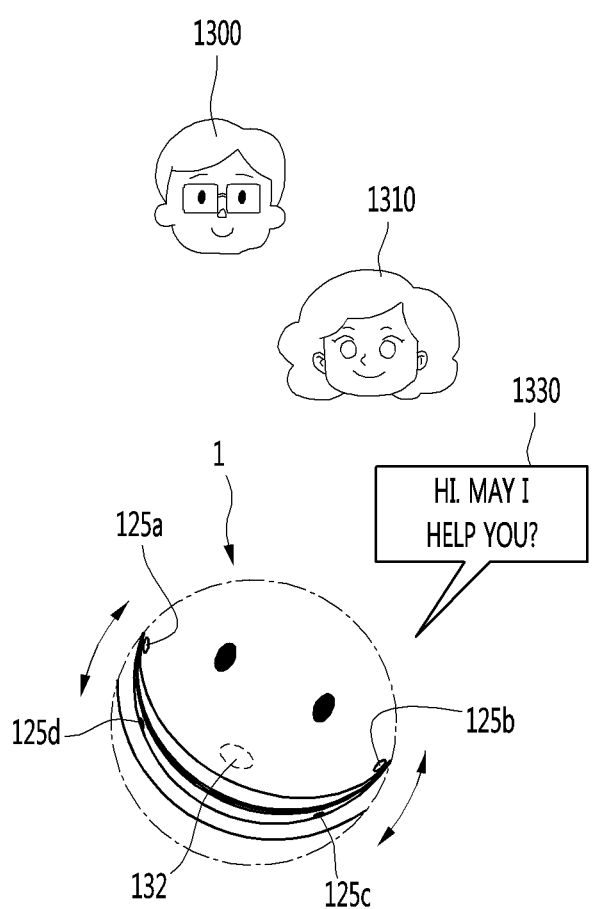

FIGS. 13 to 15 are views showing examples of operation of recognizing a user related to sound at a robot when a plurality of users is located in a direction in which sound is generated.

In some embodiments, a plurality of users may be located in the direction in which sound is detected. In general, a user who want to interact (communicate) with the robot 1 is highly likely to be closer to the robot 1 than the other users.

Accordingly, when a plurality of users is located in the direction in which sound is detected, the robot 1 may recognize a user closest to the robot 1 as a user who utters the sound, and interact with the user.

Specifically, referring to FIGS. 13 and 14, the robot 1 may rotate such that the front surface thereof is directed in the direction in which the voice 1320 is generated.

The robot 1 may acquire an image (indicated as IMAGE in FIG. 14) of the direction, in which the voice 1320 is generated, through the camera 132, and recognize a user from the image IMAGE through the user recognizer 1000.

When a plurality of users 1300 and 1310 is recognized as the result of recognition, the processor 172 or the user recognizer 1000 may recognize the user 1310 closer to the robot 1 between the plurality of users 1300 and 1310 as a user who utters the voice 1320.

For example, the processor 172 or the user recognizer 1000 may recognize the second user 1310 having a larger facial region between the facial regions 1400 and 1410 of the recognized users 1300 and 1310 as the user closer to the robot 1.

Accordingly, as shown in FIG. 15, the robot 1 may control the rotation mechanism 15 to face the second user 1310 and then output a message 1330 for performing interaction with the second user 1310. The second user 1310 may perceive that the robot 1 has correctly recognized the second user 1310 who utters the voice 1320, by confirming that the robot 1 rotates to face the second user.

Figure 16:
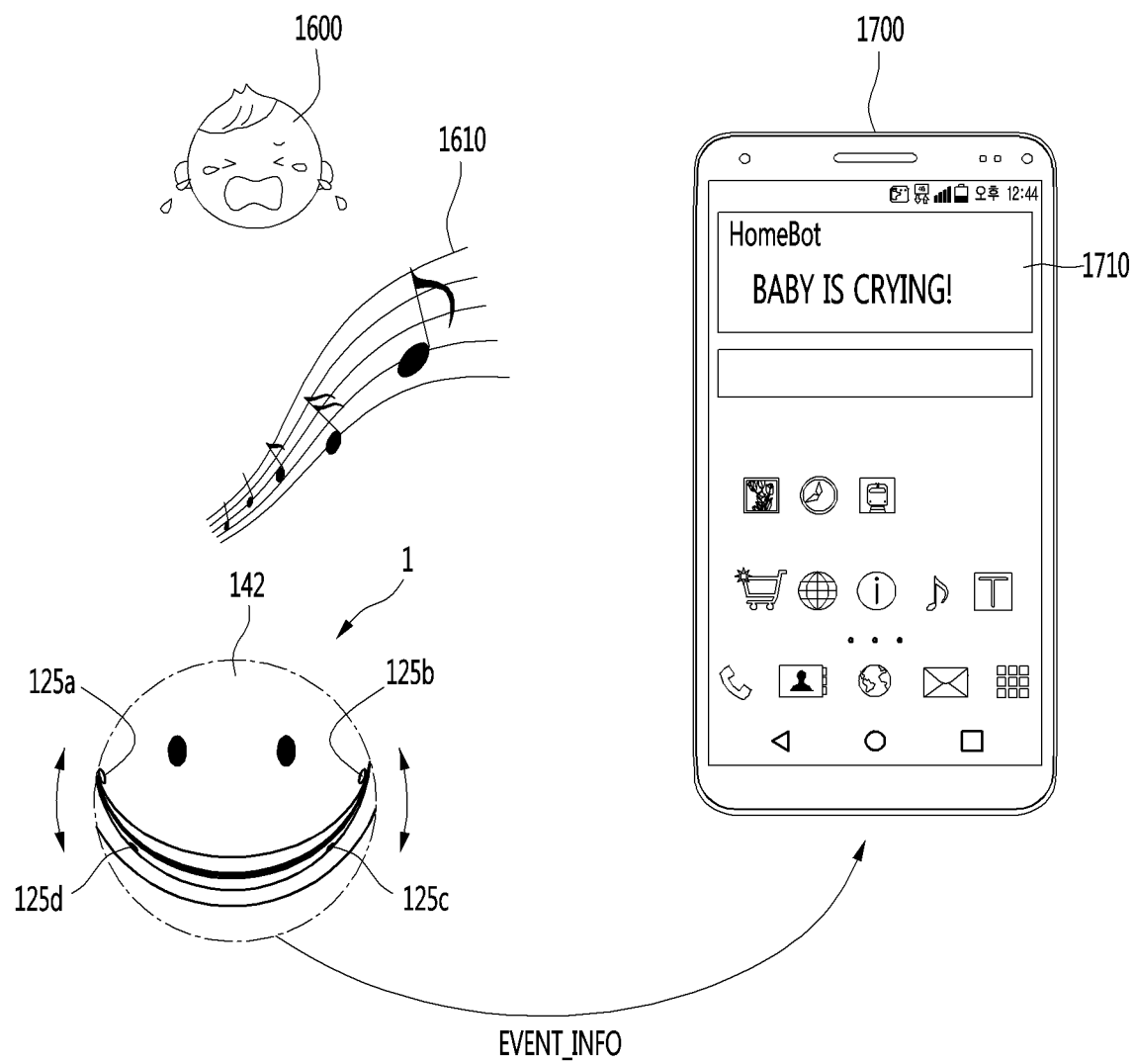
FIG. 16 is a view showing an example of operation performed by a robot when a user is not located in a direction in which sound is generated.

FIG. 16 is a view showing an example of operation performed by a robot when a user is not located in a direction in which sound is generated.

Referring to FIG. 16, the robot 1 may receive sound signals corresponding to a baby crying 1600 and control the rotation mechanism 15 such that the front surface of the robot 1 is directed in a direction, in which the baby is located, based on the received sound signals.

The processor 172 may acquire an image of the direction, in which the baby is located, through the camera 132. The user recognizer 1000 may recognize whether an already registered user (e.g., parent) is present from the acquired image.

When the user is not present as the result of recognition, the processor 172 may perform operation corresponding to the baby crying 1600 based on interaction data when the user is not present among the interaction data corresponding to the baby crying 1600.

For example, the interaction data may include sound 1610 to try to calm or soothe the baby and notification (event information EVENT_INFO) to be transmitted to the terminal 1700 of the user (such as a parent).

Based on the interaction data, the processor 172 may output sound 1610 through the sound output unit 144 and transmit the event information EVENT_INFO to the terminal 1700 of the user through the communication unit 11. The transmitted event information EVENT_INFO may be output on the screen of the terminal 1700 in the form of notification 1710, such that the user recognizes that the baby is crying.

That is, according to the embodiments shown in FIGS. 9 to 16, the robot 1 may efficiently detect the direction, in which the sound event has occurred, using the plurality of microphones.

In addition, the robot 1 may acquire the image of the detected direction using the camera 132 and recognize whether a user is present from the image, thereby more intelligently reacting to the sound event depending on whether the user is present.

According to the embodiment of the present invention, the robot may acquire sound generated in the vicinity of the robot and automatically recognize occurrence of a specific event, thereby intelligently performing interaction according to the recognized event.

In addition, the robot may filter a sound signal acquired through the microphone based on human auditory characteristics or detect a sound event louder than background noise, thereby reacting to the sound event and acting similarly to a human.

A sound event recognizer implemented in the robot may be activated only when occurrence of a sound event is detected by a sound event detector. Accordingly, it is possible to efficiently reduce a load as compared to the case where the sound event recognizer is continuously activated, thereby improving the overall processing speed and performance of the robot.

In addition, the robot can efficiently detect a direction, in which a sound event occurs, using a plurality of microphones.

In addition, the robot may acquire the image of a direction detected using a camera and recognize presence of a user from the image, thereby more intelligently reacting to a sound event depending on whether a user is present.

The foregoing description is merely illustrative of the technical idea of the present invention, and various changes and modifications may be made by those skilled in the art without departing from the essential characteristics of the present invention.

Therefore, the embodiments disclosed in the present invention are intended to illustrate rather than limit the scope of the present invention, and the scope of the technical idea of the present invention is not limited by these embodiments.

The scope of the present invention should be construed according to the following claims, and all technical ideas within the scope of equivalents should be construed as falling within the scope of the present invention.

The various devices, modules, terminals, and the like discussed herein may be implemented on a computer by execution of software comprising machine instructions read from non-transitory computer-readable medium. Non-transitory computer readable medium may refer to any medium that participates in holding instructions for execution by the processor, or that stores data for processing by a computer, and comprise all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In certain embodiments, several hardware aspects may be implemented using a single computer, terminal, or apparatus, in other embodiments multiple computers, input/output systems and hardware may be used to implement the system. For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A robot comprising:
a microphone configured to receive sound signals; and
one or more controllers configured to:
    determine at least one of a maximum sound pressure level, a minimum sound pressure level, or information on changes of sound pressure of background noise based on a sound signal received during a predetermined operation period of time at a first time point via the microphone;
    determine a reference sound pressure level varied based on the at least one of the determined maximum sound pressure level, the minimum sound pressure level, or the information on changes of sound pressure of background noise;
    determine a threshold sound pressure level varied based on the reference sound pressure level;
    detect occurrence of a sound event based on the reference sound pressure level, the threshold sound pressure level, and a sound pressure level of a sound signal received at a second time point via the microphone;
    recognize an event corresponding to the detected sound event; and
    control an operation of the robot based on the recognized event.

2. The robot of claim 1, wherein the sound event is detected when the sound pressure level of the sound signal received at the second time point exceeds the threshold sound pressure level at the reference sound pressure level.

3. The robot of claim 2, wherein the threshold sound pressure level decreases as the reference sound pressure level increases.

4. The robot of claim 1, wherein the sound signal received at the first time point and the sound signal received at the second time point are received within the predetermined operation period of time.

5. The robot of claim 1, wherein the one or more controllers are further configured to identify a particular section of the operation period of time and extract an event sound signal corresponding to the particular section based on the identification.

6. The robot of claim 1, further comprising a memory configured to store sound information of a plurality of events, wherein the one or more controllers are further configured to:
    extract a signal characteristic of the extracted event sound signal;
    compare the extracted signal characteristic with the stored sound information of the plurality of events; and
    output a response corresponding to a recognized event of the extracted signal characteristic.

7. The robot of claim 6, wherein the extracted signal characteristic includes at least a frequency characteristic or a signal change characteristic according to a lapse of time.

8. The robot of claim 6, wherein the one or more controllers are further configured to:
    determine a similarity value between the extracted signal characteristic of the extracted event sound signal and each of the stored sound information of the plurality of events;
    wherein the recognized event corresponds to a highest determined similarity value among the stored sound information of the plurality of events which have determined similarity values greater than or equal to a reference similarity value.

9. The robot of claim 1, further comprising a display and a sound output unit, wherein the operation of the robot comprises outputting information via the display or the sound output unit based on the recognized event.

10. A machine-readable non-transitory medium having stored thereon machine-executable instructions for controlling a robot, the instructions comprising:
    determining at least one of a maximum sound pressure level, a minimum sound pressure level, or information on changes of sound pressure of background noise based on a sound signal received during a predetermined operation period of time at a first time point via the microphone;
    determining a reference sound pressure level varied based on the at least one of the determined maximum sound pressure level, the minimum sound pressure level, or the information on changes of sound pressure of background noise;
    determining a threshold sound pressure level varied based on the reference sound pressure level;
    detecting occurrence of a sound event based on the reference sound pressure level, the threshold sound pressure level, and a sound pressure level of a second sound signal received at a second time point via the microphone;
    recognizing an event corresponding to the detected sound event; and
    controlling an operation of the robot based on the recognized event.

11. The machine-readable non-transitory medium of claim 10 further having stored thereon machine-executable instructions for:
    detecting the sound event when the sound pressure level of the sound signal received at the second time point exceeds the threshold sound pressure level at the reference sound pressure level.

12. The machine-readable non-transitory medium of claim 11 wherein the threshold sound pressure level decreases as the reference sound pressure level increases.

13. The machine-readable non-transitory medium of claim 10 wherein the sound signal received at the first time point and the sound signal received at the second time point are received within the predetermined operation period of time.

14. The machine-readable non-transitory medium of claim 10 further having stored thereon machine-executable instructions for:
identifying a particular section of the operation period of time and extracting an event sound signal corresponding to the particular section based on the identification.

15. The machine-readable non-transitory medium of claim 10 further having stored thereon machine-executable instructions for:
extracting a signal characteristic of the extracted event sound signal;
comparing the extracted signal characteristic with the stored sound information of the plurality of events; and
outputting a response corresponding to a recognized event of the extracted signal characteristic.

16. The machine-readable non-transitory medium of claim 15 wherein the extracted signal characteristic includes at least a frequency characteristic or a signal change characteristic according to a lapse of time.

17. The machine-readable non-transitory medium of claim 15 further having stored thereon machine-executable instructions for:
determining a similarity value between the extracted signal characteristic of the extracted event sound signal and each of the stored sound information of the plurality of events;
wherein the recognized event corresponds to a highest determined similarity value among the stored sound information of the plurality of events which have determined similarity values greater than or equal to a reference similarity value.

18. The machine-readable non-transitory medium of claim 10 wherein the operation of the robot comprises outputting information via a display or a sound output unit of the robot based on the recognized event.

\* \* \* \* \*